3,056,417
CONTROLLING APPARATUS
Harry E. Greaves, Feasterville, Pa., assignor to Minneapolis-Honeywell Regulator Company, Minneapolis, Minn., a corporation of Delaware
Filed Oct. 3, 1958, Ser. No. 765,231
9 Claims. (Cl. 137—86)

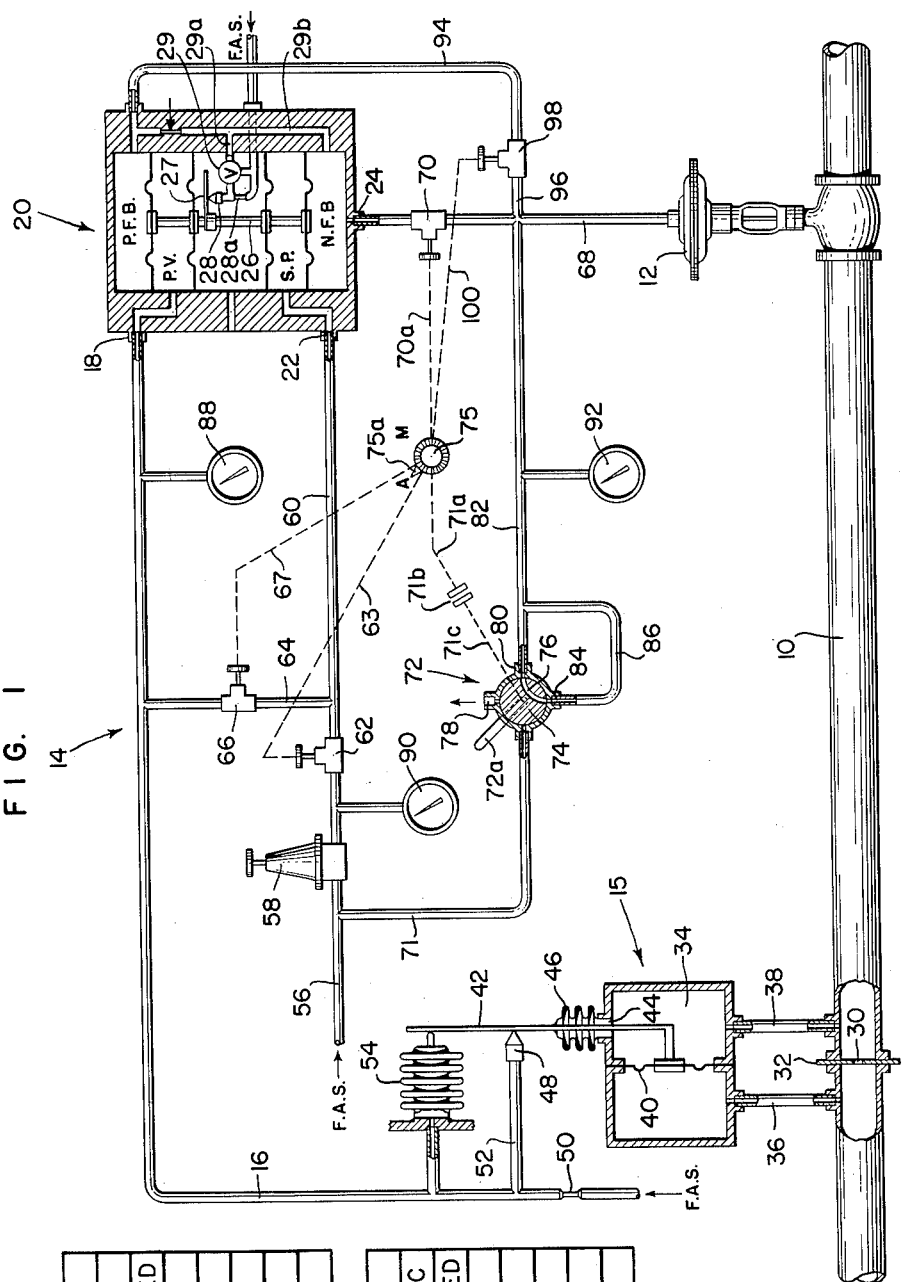

This invention relates to means for automatically and manually controlling the energy state of a fluid and particularly to means for automatically and manually controlling the flow of fluid through a pipe. Most particularly, this invention relates to an apparatus for switching the control of a fluid pressure being applied to the head of a control valve located in a flow pipe to and from an automatic and manual control position without this valve experiencing any surge or bump in the pressure being applied thereto.

While means have heretofore been devised to switch to and from automatic control and from and to manual control of fluid flow through a pipe, such means normally is time consuming as it involves a three position valve, one of the positions being a seal position in which the three position valve must be held for some period of time.

Another object of the present invention is the provision of an apparatus for automatically and manually controlling the flow of fluid through a pipe which apparatus may be switched directly to and from its manual and automatic control positions without the need of going through a seal position.

Still another object of the present invention is to provide an economical bumpless switching apparatus of the aforementioned type that requires only one pressure regulator.

In the drawing:

FIG. 1 in the drawing diagrammatically illustrates apparatus embodying the present invention for automatically and manually controlling the flow of fluid through a pipe and for bumplessly switching to and from the automatic and manual control conditions.

FIG. 2 shows a chart indicating to what position the valves of the bumpless switching apparatus may be positioned during or after a shift is made from automatic to manual control.

FIG. 3 shows a chart indicating to what position the valves of the bumpless switching apparatus may be positioned during or after a shift is made from manual to automatic control.

Referring now to the drawing in detail, fluid such as a gas or a liquid flowing through a pipe 10 is controlled by an automatically operable control valve 12. The valve 12 is controlled in turn by apparatus 14 embodying the present invention. In order to measure the flow of fluid through the pipe 10, a flow meter 15 is provided which flow meter is adapted to regulate the pressure in a pipe 16 in accordance with sensed changes in differential pressure across an orifice or, in other words, flow through the pipe 10. The pressure in the pipe 16 may be termed the "process variable" since the value of that pressure varies proportionally with respect to any change that occurs in the aforementioned differential pressure which result from flow changes occurring in the pipe 10. Of course, if apparatus 14 were to control the pressure in the pipe 10, then a suitable pressure sensitive device could be substituted for flow meter 15 to supply a pressure to pipe 16 proportional to the pressure in pipe 10. Pipe 16 is connected to an inlet 18 of an automatic controller 20. Controller 20 is further connected by means of another inlet 22 to a regulated filtered air supply FAS the regulated pressure of which, as will become more apparent hereinafter, determines the opening in valve 12 and hence the rate of flow through pipe 10.

The type of controller 20 is of the type described and is shown in U.S. Patent No. 2,773,506, granted to W. E. Bauer on December 11, 1956, for Elastic-Fluid-Pressure-Actuated Means for Adjusting the Proportional Band of a Controller, and assigned to the assignee hereof. This controller 20 is of a type which, during automatic operation, compares the process variable, that is the pressure being supplied through inlet 18 with the pressure of the regulated filtered air supply, wihch may be termed the "set point" or reference pressure and puts out a pressure through an outlet 24 from a negative feedback chamber N.F.B. which pressure is dependent upon a comparison of the pressures supplied through inlets 18 and 22.

FIG. 1 of the drawing shows an inlet 18 of the aforementioned controller connected to the process variable chamber P.V. and the inlet 22 connected to the set point chamber S.P. A rod 26 which fixedly connects the diaphragm forming the upper and lower walls of the process variable P.V. and set point chambers S.P. moves in an up or down direction from the position shown in accordance with the pressure differential that exists between the pressure in the process variable chamber P.V. This movement causes a flapper 27 and the pressure in the set point chamber S.P. to be moved towards or away from a nozzle 28 which is connected by way of a pilot valve 29 to the negative feedback chamber N.F.B. of the controller. The pilot valve 29 is shown connected to a filtered air supply F.A.S. and the nozzle is shown connected by way of a restriction 28a.

The aforementioned description relates to a controller action that takes place during automatic operation, or in other words, an operation in which the controller is applying a pressure to the head of the control valve 12. As the flapper 27 is moved toward the nozzle 28, due to an increase in the process variable being applied to the process variable chamber P.V., while operating under the aforementioned automatic control condition the pressure change occurring within the nozzle will be applied to the pilot valve 29. When this pilot valve 29 receives this increase in nozzle chamber pressure it will in turn apply a pressure which is proportional to the increase in nozzle pressure by way of conduits 29a, 29b, the N.F.B. chamber, outlet 24, valve 70 which is then open, conduit 68 to the head of the control valve which applied pressure will be of a greater magnitude than that of the nozzle pressure. In a similar but reverse fashion, it can readily be seen from the aforementioned description that the head of the control valve 12 will receive a proportionally lower pressure from this pilot valve 29 when as the flapper is moved away from the nozzle 28.

As stated hereinbefore, the apparatus 14 includes a flow meter 15. Flow meter 15 is responsive to changes in the differential pressure which occurs across the orifice 30 of plate 32 that is disposed in flow of fluid passing through the pipe 10. The pressure on each side of the plate 32 is supplied to a chamber 34 by means of pipes 36 and 38. Chamber 34 is divided into two chamber sections by a diaphragm 40 which isolates the pressure supplied by pipe 36 from the pressure supplied by pipe 38. A flapper lever 42 is connected to diaphragm 40 and extends out of the chamber 34 through an opening 44 sealed by a sealing bellows 46. The flapper lever 42 varies the flow of fluid from a nozzle 48 which is connected from a suitable fluid source such as filtered air supply FAS through a restriction 50 and a pipe 52. The pressure variations caused by the changes in flow through the nozzle 48 are supplied to the pipe 16 and are proportional to the differential pressure across the orifice 30. Thus the pressure in pipe 16 constitutes a process variable. As shown herein, a follow up bellows 54 which is also connected to the pipe 16 is provided as a feed back system to restore lever 42 to its original or neutral position. The pipe 16 is connected directly to inlet 18 of the controller 20 to supply that controller with a pressure varying in accordance with the square root of the flow of the fluid that is passing through the pipe 10.

To supply controller 20 with a set point or reference pressure, a filtered air supply is connected by a pipe 56 to a suitable regulating means 58 which may be a manually adjustable pressure regulator that is shown, a jet balance valve system or any other suitable means for maintaining constant the pressure in pipe 56. On the output side of the regulating means 58 is a pipe 60 having a valve 62 operated by a suitable mechanical link 63 interposed therein. This pipe 60 extends from the regulating means 58 to the inlet 22 of the controller 20. By adjusting the regulating means 58, the pressure supplied to the inlet 22 may be changed to thus alter the reference or set point pressure supplied to the S.P. chamber of the controller when on automatic control. A pipe 64 having a valve 66 operated by a suitable mechanical link 67 interposed therein connects pipe 16 with pipe 60, the latter connection being on the opposite side of valve 62 from the pipe 56. The outlet 24 of controller 20 has connected thereto a pipe 68 having a valve 70 operated by a suitable mechanical link 70a interposed therein. Pipe 68 is connected to valve 12 which accurately controls the flow of fluid through pipe 10 in accordance with the pressure in pipe 68.

Also connected to pipe 56 is a pipe 71 which is connected in turn to a valve loading valve 72. Valve 72 is operated by a suitable mechanical link 71a through, for example, a clutch 71b, link 71c and gearing built therein which linkage will provide rotary motion to member 74 from a control knob 75. The member 74 of valve loading valve 72 is thus operable to be opened or closed in the sequence shown in FIGS. 2 and 3 by manually rotating control knob 75 and the pointer 75a thereon between its manual M and automatic A position. When clutch 71b is released, a lever 72a which is fixedly attached to this member 74 can be used to manually alter the position of the member as will hereinafter be described in detail. This valve member 74 has a right angle channel 76 therein and an atmospheric bleed 78 ninety degrees from the point of connection of pipe 71. Disposed ninety degrees from the bleed 78 is an opening 80 to which is connected a pipe 82 which in turn is connected at its opposite end to pipe 68 on the opposite side of valve 70 from outlet 24 of controller 20. Disposed ninety degrees from opening 80 in valve 72 is an opening 84 to which is connected a pipe 86 which in turn is connected to pipe 82.

Means are provided to measure the process variable pressure, that is the pressure in pipe 16, the set point pressure, that is the pressure in pipe 60 and the valve loading pressure, that is the pressure in pipe 82 which is the same as the pressure in pipe 68. These pressure measuring means include a pressure indicator 88 connected to pipe 16 adjacent inlet 18, a pressure indicator 90 connected to pipe 60 on the input side of valve 62 and a pressure indicator 92 connected to pipe 82.

The present invention makes use of a conduit 94, 96 shown in FIG. 1 of the drawing to connect the positive feed back chamber P.F.B. with the conduit 68. This FIG. 1 also shows a valve 98 between these conduits 94, 96 which may be closed, turning control knob 75 and mechanical link 100 connected thereto from the knobs manual control position M to its automatic control position A.

When the pointer 75a of control knob is set for automatic operation A as shown in FIG. 1 the mechanical linkage 63, 67, 70a, 100, 71a and 71c will have rotated valve 62 to an open position, valve 66 to a closed position, valve 70 to an open position, valve 98 to a closed position and valve 72 to the closed position in that the pipe 82 is not connected to pipe 71 or to bleed 78. In such a condition, the loading valve 58 operates to cause a pre-determined set point pressure to be supplied to inlet 22 of controller 20 through open valve 62. This set point pressure cannot be supplied to pipe 16 as valve 66 at this time is closed. Furthermore, the filtered air supply pressure cannot be supplied directly to valve 12 as valve 72 prevents the application of this pressure thereto. Accordingly, in the automatic condition of the apparatus, the set point pressure is supplied solely to inlet 22 and is indicated by the pressure indicator 90. The square root of the flow through pipe 10 is measured by flow meter 15 which causes a pressure proportional thereto be supplied to pipe 16 as heretofore described. The pressure in pipe 16 is supplied to the controller 20 through inlet 18 and is measured by the indicator 88. As previously described in detail, controller 20 compares the set point pressure in pipe 60 with the process variable pressure in pipe 16 and in accordance with said comparison, regulates the pressure at outlet 24 which in turn is supplied directly to the valve 12 through pipe 68 and the then open valve 70. The pressure supplied to valve 12 is measured by the pressure indicator 92. If the pressure supplied to controller 20 through inlet 18 is greater than the set point pressure supplied to inlet 22 and it is increased to a still higher level then the controller will operate to increase the pressure at outlet 24 and thus actuate valve 12 to adjust the flow in pipe 10 so that the flow meter will reduce the pressure in pipe 16 to equalize the input pressures in the controller 20 thus to make the pressure in the process variable chamber P.V. line out with the pressure in the set point chamber S.P. Corrective action will take place if the process variable pressure supplied to inlet 18 is less than the set point pressure supplied to inlet 22 and it is lowered to a still lower level. Thus, the apparatus in its "automatic" condition operates in a conventional manner to continuously cause the pressure in the process variable chamber P.V. to line out with the pressure in the set point chamber S.P. regardless of whether the set point pressure is higher or lower than the process variable pressure.

In order to switch from the automatic condition described above to the "manual" condition wherein the control of valve 12 is manually regulated by lever 72a of the valve loading valve 72, the following steps are taken. The regulator 58 is adjusted slightly so as to cause the set point pressure indicator 90 to read exactly the same value as the process variable pressure indicator 88 if these pressures are not equal at the time such a switching operation takes place. However, in most cases the action of the controller which has been described supra will have made these two pressures equal and no adjustment of the regulator will be required. With these two meters showing the same pressure reading, valve 66 connecting pipe 16 to pipe 60 is opened by turning control knob 75 and pointer 75a attached thereto to its manual position M without any surge of pressure being supplied to the controller as the pressure in these two pipes is now equal. The valve 70 in the output line 68 of controller 20 is also simultaneously closed when the aforementioned shift to manual control is made to cut off the pressure in this output line 68 that is below the valve 70. Hence, there will be no variations in the pressure supplied to valve 12 and the flow through pipe 10 will be constant. While the aforementioned valve closing action takes place the valve 62 is also simultaneously closed when the aforementioned shift is made in order to cut off the regulated filtered air supply F.A.S. from pipe 60 which pipe is now tied in through valve 66 with the process variable pressure in pipe 16. This assures that during manual operation the process variable pressure will be applied to both the process variable chamber P.V. and the set point chamber S.P. of the controller 20. As the aforementioned change in position of valve 70 and 62 takes place a change in the position of the valve loading valve 72 also takes place as the knob 75 and pointer connected thereto is moved to the aforementioned manually operative position M. This change in position of the loading valve 72 may be to a position which is as shown in dotted line form in which the valve may be manually adjusted so that the filtered air supply F.A.S. may be applied to the head of the control valve by way of conduits 56, 71, 82 and 68 which was not present when the valve was in a closed position during automatic control positioning of same. This valve 72, may for example, be rotated manually forty five degrees counter-clockwise from its dotted line position or if clutch 71b is included from its solid line position, by lever 72a to directly connect the filtered air supply which is supplied through pipes 56, 71, channel 76 of valve 72 by way of conduit 86 to the pipe 82 to increase the pressure being applied to the control valve 12. When the pressure that is desired to be applied to the head of the control 12 is reached the valve 72 may then be returned to its manual or, in other words, its dotted line position. Valve 72 may also be rotated one hundred and eighty degrees clockwise from its dotted line position, or if clutch 71b is unclutched only ninety degrees counter-clockwise from its solid position, shown in the drawing, so as to bleed off some of the air in pipes 82 and 68 to reduce the pressure in these pipes while in manual control. Hence, by manual operation of valve 72 in the aforementioned manner the pressure on valve 12 may be varied to thus manually control the degree to which the control valve 12 is opened or closed. During the manual controlling of control valve 12, the process variable pressure supplied to pipe 16 will vary, but since this process variable pressure is also supplied through valve 66 to pipe 69 to the set point chamber the pressure at outlet 24 will remain constant since the latter mentioned pressure is dependent upon a differential which will be zero during manual operation.

One of the salient features of the invention is to provide the aforementioned technique in which the effect of changes in process variable will not cause the pressure in the negative feedback chamber N.F.B. of the controller to change during manual M operation. Another feature of the invention is to then be able to provide a way of keeping the controller aware of changes in the pressure that is being applied to the head of the control valve during the manual control operation M. This latter feature is accomplished by the provision of a valve 98 in a conduit 94, 96 which connects the pressure being manually applied to the control valve during manual operation M back to the positive feedback chamber P.F.B. of the controller. In this way the rod 26 may be caused to move downwardly or upwardly as increases or decreases take place in the pressure applied to the control valve 12. As this rod motion takes place the flapper 27 will be moved in a similar fashion as the rod, with respect to the nozzle 28 to cause the pressure in this nozzle and the resulting pressure being applied by pilot valve 29 to the negative feedback chamber to increase or decrease. With this arrangement the pressure in the portion of the conduit 68 between outlet 24 and the valve 70 will always be kept equal to the manually adjusted pressure that is being applied to the head of the control valve 12 so that a switch back to automatic may be made without a bump.

When a switch in the pointer 75a of control knob 75 is made from the manual condition M to which it has been operated back to the automatic condition A heretofore described, the valve loading valve 72 is moved to a closed or solid line position by either rotating this knob 75 to its automatic position if clutch 71b is engaged or by rotating handle 72a if clutch is disengaged after the position of regulator 58 is altered to make the set point pressure in pipe 56 as indicated by pressure indicator 88. This action will lock in the valve pressure that is then retained in pipe 82 and 68. The pressure regulator 58 may again be altered so as to make any set point pressure change that is desired when operating on automatic control. When the set point pressure as indicated by pressure indicator 90 equals the pressure of the process variable as indicated by pressure indicator 88, valve 66 is closed by rotating knob 75 and its pointer 75a to its automatic position A and this will have no effect on the controller since the pressure now in pipe 60 is sealed in. The valve loading valve 72 is also simultaneously operated in the aforementioned manner to seal the pressure in pipes 82 and 68 when the indicator pointer 75 is moved to the automatic position shown in the drawing. This locks out the filtered air supply FAS from pipe 56 from being applied to the control valve. Valve 62 is also simultaneously opened when the rotation of knob 75 and its pointer 75a to its automatic position A takes place without effecting any change in the controller as the pressure in pipe 56 between the regulator 58 and valve 62 at that time is equal to the pressure in pipe 60. The outlet pressure of controller 20 at outlet 24 will, due to the fact that the above steps have been taken, be equal to the pressure in pipe 68. Accordingly, valve 70 may also be simultaneously opened when the rotation of knob 75 and its pointer 75a to its automatic position A takes place so as to connect the pressure applied within outlet 24 directly to valve 12 through pipe 68 without a bump occurring as the pressures on both sides of valve 70 are the same at this moment. Accordingly, the switch from manual control back to automatic control will be effected without any bump or surge of flow through pipe 10. Thereafter, the set point pressure may be regulated to any desired value and the controller will operate in the usual manner to keep the flow through pipe 10 in step with said set point adjustment.

As previously described in detail, the apparatus disclosed in this application also permits switching from automatic control A to manual control M by first making the magnitude of the set point pressure equal to the magnitude of the process variable; secondly, making use of changes in this process variable in the set point chamber S.P. and process variable chmber P.V. of the controller to neutralize the effect that changes in this process variable would have on the output pressure of the controller to adjust the set point of the controller 20; thirdly, cutting in the pressure being applied manually to the control valve 12 with the positive feedback chamber to keep the controller output pressure in step with the manually applied control valve pressure; and fourthly cutting off the pressure being applied by the controller to the control valve so that a fluid pressure from a supply source can then be manually applied to the head of this valve to increase the pressure thereon or so the pressure then on the head of this valve can be bled to atmosphere to decrease the control valve pressure.

From the aforementioned description of the controlling apparatus described in this application it can be seen that this apparatus affords a unique way of switching from automatic control to manual control and then back to automatic control without incurring a bump or surge in the pressure that is being applied to a control valve which valve is employed to control the flow of fluid in a flow pipe.

What is claimed is:

1. An apparatus for bumplessly switching the control of a fluid pressure being applied to a control valve in a flow line by a pneumatic controller from an automatic to a manually regulated control position, comprising a valve switching means to simultaneously apply a process variable to a set point chamber of said pneumatic controller whose output pressure is being applied to the head of said valve, to lock out a set point pressure from being applied to a set point chamber of said controller, to lock off said output pressure of said controller from being applied to said control valve and to provide a connection between said locked in pressure acting on the head of said control valve with a positive feedback chamber of said controller.

2. An apparatus for bumplessly switching the control of a fluid pressure being applied to a control valve in a flow line by a pneumatic controller from a manual to an automatic regulated control position, comprising a valve switching means to simultaneously cut out a processed variable being applied to a set point chamber of said pneumatic controller whose output pressure is locked off from being applied to the head of said valve, to cut in a set point pressure to a set point chamber of said controller, to cut in the said output pressure of said controller with said control valve and to cut out said pressure acting on the head of said control valve with a positive feedback chamber of said controller.

3. A control apparatus for bumplessly switching the control of fluid pressure being applied to a final control element by an automatic controller directly between either an automatic and a manual control position or in a reverse manner between said manual control position and said automatic control position, comprising a first and second fluid pressure inlet pipe communicating with said controller at one of their ends and adapted to respectively receive a first fluid pressure whose magnitude is representative of a process variable and a second fluid pressure whose magnitude is representative of a set point, means operably connected with a positive feedback chamber of said controller for comparing the fluid pressure applied to each of said inlet pipes, said controller being further provided with a pressure regulating means controlled by the magnitude of a pressure applied to said positive feedback chamber and the difference in the magnitude of said inlet pressures of said pressure comparing means, said pressure regulating means being connected to an outlet of said controller to apply a pressure which varies with the magnitude of pressure in said positive feedback chamber and said differential existing between said process variable and set point fluid pressures, said apparatus further comprising a normally opened closable valve interposed in said second inlet pipe, a third pipe connected at one end to said first inlet pipe and at its other end to said second inlet pipe between said last-mentioned valve and its end that is in communication with said controller, a normally closed openable valve interposed in said third pipe, a fourth pipe connected at one end to said controller outlet and at its other end to said final control element, a second normally opened closable valve interposed in said fourth pipe, a fifth pipe connected at one end to said second inlet pipe between the other end of the latter and said first-mentioned normally opened closable valve therein and said fifth pipe being connected at its other end to said fourth pipe between said second-mentioned normally opened closable valve and said final control element, a valve interposed in said fifth pipe and operable to and from a first normal condition wherein said valve is closed, to and from a second condition wherein said valve is opened to connect the said fourth pipe and the portion of said fifth pipe adjacent said fourth pipe to either said pressure source in said second inlet pipe or atmospheric pressure, said apparatus being conditioned for automatic control by said controller when said valves interposed in said second inlet, third, fourth, and fifth pipes are in their normal condition, and a valve located in a sixth pipe which connects said positive feedback chamber of said controller and said fourth pipe is closed and apparatus being conditioned for manual control by said valve interposed in said fifth pipe when said valves interposed in said second inlet, third, fourth, and fifth pipes are in their opposite condition and said valve in said sixth pipe is open.

4. A control apparatus for bumplessly switching the control of fluid pressure being applied to a final control element by an automatic controller directly between either an automatic and a manual control position or in a reverse manner between said manual control position and said automatic control position, comprising a first and second fluid pressure inlet pipe communicating with said controller at one of their ends and adapted to respectively receive a first fluid pressure whose magnitude is representative of a process variable and a second fluid pressure whose magnitude is representative of a set point, means operably connected with a positive feedback chamber of said controller for comparing the fluid pressure applied to each of said inlet pipes, said controller being further provided with a pressure regulating means controlled by the magnitude of a pressure applied to said positive feedback chamber and the difference in the magnitude of said inlet pressures of said pressure comparing means, said pressure regulating means being connected to an outlet of said controller to apply a pressure therein which varies with the magnitude of pressure in said positive feedback chamber and said differential existing between said process variable and set point fluid pressures, said apparatus further comprising a normally opened closable valve interposed in said second inlet pipe, a third pipe connected at one end to said first inlet pipe and at its other end to said second inlet pipe between said last mentioned valve and its end that is in communication with said controller, a normally closed openable valve interposed in said third pipe, a fourth pipe connected at one end to said controller outlet and at its other end to said final control element, a second normally opened closable valve interposed in said fourth pipe, a fifth pipe connected at one end to said second inlet pipe between the other end of the latter and said first-mentioned normally opened closable valve therein and said fifth pipe being connected at its other end to said fourth pipe between said second-mentioned normally opened closable valve and said final control element, a second normally closed element interposed in said fifth pipe to cut off said source of fluid under pressure in said second inlet pipe from being applied through said fifth pipe to said fourth pipe, said apparatus being conditioned for automatic control by said controller when said valves interposed in said second inlet, third, fourth, and fifth pipes are in their normal conditions and a valve located in a sixth pipe which connects a positive feedback chamber of said controller and said fourth pipe is closed, and said apparatus being positioned for manual control by positioning said valves interposed in said second inlet, third, fourth, and fifth pipes in their opposite condition and said valve in said sixth pipe is open.

5. A control apparatus for bumplessly switching the control of fluid pressure being applied to a final control element by an automatic controller directly between either an automatic and a manual control position, or in a reverse manner between said manual control position and said automatic control position, comprising a first and second pressure inlet pipe communicating with said controller at one of their ends and adapted to respectively receive a first fluid pressure of varying magnitude and a second fluid pressure of a preselected fixed magnitude, means operably connected with a positive feedback chamber of said controller for comparing the pressure applied to each of said inlet pipes, said controller being further provided with a pressure regulating means controlled by the magnitude of a pressure applied to said positive feedback chamber and the difference in the magnitude of said inlet pressures of said pressure comparing means, said pressure regulating means being connected to an outlet of said controller to apply a pressure therein which varies with the magnitude of pressure in said positive feedback chamber and said differential existing between the pressures applied to said inlets, said apparatus further comprising, a normally opened closable valve interposed in said second inlet pipe, a third pipe connected at one end to said first pipe and at its other end to said second inlet pipe between said last-mentioned valve and its end that is in communication with said controller, a normally closed openable valve interposed in said third pipe, a fourth pipe connected at one end to said controller outlet and at its other end to said final control element, a second normally opened closable valve interposed in said fourth pipe, a fifth pipe connected at one end to said second inlet pipe between the other end of the latter and said first-mentioned normally opened closable valve and being connected at its other end to said fourth pipe between said second-mentioned normally opened closable valve and said final control element, valve means interposed in said fifth pipe and operable to and from a first normal condition wherein said valve means is closed to cut off said source of fluid pressure in said second pipe from being applied through said fifth pipe to said fourth pipe, said apparatus being conditioned for automatic control by said controller when said valves in said second inlet, third, fourth, and fifth pipes are in their normal condition and a valve located in a sixth pipe which connects a positive feedback chamber of said controller and said fourth pipe is closed, and said apparatus being conditioned for manual control by said valve means interposed in said fifth pipe when said valve means interposed in said second inlet, third, and fourth pipes are in their opposite condition and said valve in said sixth pipe is open.

6. A control apparatus for bumplessly switching the control of fluid pressure being applied to a final control element by an automatic controller directly between either an automatic and a manual control position or in a reverse manner between said manual control position and said automatic control position, comprising a first and second fluid pressure inlet pipe communicating with said controller at one of their ends and adapted to respectively receive a first fluid pressure whose magnitude is representative of a process variable and a second fluid pressure whose magnitude is representative of a set point, means operably connected with a positive feedback chamber of said controller for comparing the fluid pressure applied to each of said inlet pipes, said controller being further provided with a pressure regulating means controlled by the magnitude of a pressure applied to said positive feedback chamber and the difference in the magnitude of said inlet pressures of said pressure comparing means, said pressure regulating means being connected to an outlet of said controller to apply a pressure which varies with the magnitude of pressure in said positive feedback chamber and said differential existing between said process variable and set point fluid pressures, said apparatus further comprising a normally opened closable valve interposed in said second inlet pipe, a third pipe connected at one end to said first inlet pipe and at its other end to said second inlet pipe between said last-mentioned valve and its end that is in communication with said controller, a normally closed openable valve interposed in said third pipe, a fourth pipe connected at one end to said controller outlet and at its other end to said final control element, a second normally opened closable valve interposed in said fourth pipe, a fifth pipe connected at one end to said second inlet pipe between the other end of the latter and said first-mentioned normally opened closable valve therein, said fifth pipe being connected at its other end to said fourth pipe between said second-mentioned normally opened closable valve and said final control element, an element interposed in said fifth pipe and operable to and from a first condition wherein said valve is normally closed, to and from a second condition wherein said valve is opened to connect the fourth pipe and a portion of said fifth pipe adjacent said fourth pipe to either pressure source in said second inlet pipe or atmospheric pressure, said apparatus being conditioned for automatic control by said controller when said valves interposed in said second inlet, third, fourth, and fifth pipes are in their normal condition and a valve located in a sixth pipe which connects said positive feedback chamber of said controller with a portion of said fourth pipe which is connected to said fifth pipe is closed; said apparatus being conditioned for switching between said automatic control position to said manual control position by altering the position of a regulator in said second inlet pipe to adjust the pressure in said third pipe to equal the pressure in said first inlet pipe, jointly opening said valve in said third pipe, closing the valve in said fourth and second inlet pipes and opening said valve in said sixth pipe whereby to condition said apparatus for manual control by operation of said valve in said fifth pipe; and said apparatus being operable to switch said control back from said manual control position to said automatic control position by altering the position of said regulator in said second inlet pipe to cause the pressure in the portion of said second inlet pipe between said regulator and the valve in said second inlet pipe to equal the pressure in the remaining portion of said third pipe, jointly closing the valve in said fifth pipe, said third pipe and said sixth pipe and opening said valve in said fourth pipe and the second inlet pipe, whereby to restore said apparatus to automatic control by said controller.

7. A control apparatus for bumplessly switching the contol of fluid pressure being applied to a final control element by an automatic controller directly between either an automatic and a manual control position, or in a reverse manner between said manual control position and said automatic control position, comprising a first and second fluid pressure conduit means communicating with said controller at one of their ends and adapted to respectively receive a first fluid pressure whose magnitude is representative of a pressure variable and a second fluid pressure whose magnitude is representative of a set point, means operably connected with positive feedback chamber of said controller for comparing the fluid pressure applied to each of said conduit means, said controller being further provided with a pressure regulating means controlled by the magnitude of a pressure applied to said positive feedback chamber and the difference in the magnitude of said fluid pressure of said pressure comparing means, said pressure regulating means being connected to an outlet of said controller to apply a pressure which varies with the magnitude of pressure in said positive feedback chamber and said differential existing between the process variable and set point pressures, said apparatus further comprising, a third conduit means connecting said outlet of said controller to said final control element, a fourth conduit means connecting said first conduit means to said second conduit means, a manually regulable fluid pressure means positioned in said second conduit, a fifth conduit means to momentarily connect a filtered air supply pressure flowing to the manually regulable fluid pressure supply means with said final control element, a sixth conduit means connecting said positive feedback chamber with said third conduit means, said apparatus being conditioned for automatic control when said first, second and third conduit means are open and said fourth, fifth, and sixth conduit means are closed; said apparatus being conditioned for switching directly between said automatic control position and a manual control position when said manually regulable fluid pressure supply means in said second conduit means is adjusted to make the pressure therein equal to the pressure in said first conduit means, when said second conduit means is closed and said fourth conduit means is simultaneously opened, and when said third conduit means is closed and the fifth conduit means is opened, a manually actuated means in said fifth conduit means to regulate the magnitude of said filtered air supply pressure that is permitted to pass through an opening in said fifth conduit to said final control element, said apparatus being conditioned for switching directly between said manual control position to said automatic control position when said regulable pressure supply means is adjusted so that the pressure to be supplied thereby to said second conduit means equals the process variable pressure being supplied by said first conduit means to said controller and said fourth, fifth, and sixth conduit means are closed, while said second and third conduit means are simultaneously open.

8. A control apparatus for bumplessly switching the control of fluid pressure being applied to a final control valve by an automatic controller directly between either an automatic and a manual control position, or in a reverse manner between said manual control position and said automatic control position, comprising a first and second fluid pressure conduit means communicating with said controller at one of their ends and adapted to respectively receive a first fluid pressure whose magnitude is representative of a pressure variable and a second fluid pressure whose magnitude is representative of a set point, means operably connected with a positive feedback chamber of said controller for comparing the fluid pressure applied to each of said conduit means, said controller being further provided with a pressure regulating means controlled by the magnitude of a pressure applied to said positive feedback chamber and the difference in the magnitude of said fluid pressures of said pressure comparing means, said pressure regulating means being connected to an outlet of said controller to apply a pressure which varies with the magnitude of pressure in said positive feedback chamber and said differential existing between the process variable and set point pressures, said apparatus further comprising, a third conduit means connecting said outlet of said controller to said final control valve, a fourth conduit means connecting said first conduit means to said second conduit means, a regulable fluid pressure supply means positioned in said second conduit, a fifth conduit means to momentarily connect a filtered air supply pressure flowing to the regulable fluid pressure supply means with said final control valve, a sixth conduit means connecting said positive feedback chamber with said third conduit means, said apparatus being conditioned for automatic control when said first, second and third conduit means are open and said fourth, fifth, and sixth conduit means are closed; said apparatus being conditioned for switching directly between said automatic control position and a manual control position when said manually regulable fluid pressure supply means in said second conduit means is adjusted to make the pressure therein equal to the pressure in said first conduit, when said second conduit means is closed and said fourth conduit means is simultaneously opened, to assure that the pressure in said controller first and second fluid pressure conduit means will remain equal while closing said third conduit means and opening said fifth and sixth conduit means and a manually actuated means in said fifth conduit means to thereafter regulate the magnitude of said filtered air supply pressure that is permitted to pass through said fifth conduit to said final control valve.

9. A control apparatus for bumplessly switching the control of fluid pressure being applied to a final control valve by an automatic controller directly between either an automatic and a manual control position, or in a reverse manner between said manual control position and said automatic control position, comprising a first and second fluid pressure conduit means communicating with said controller at one of their ends and adapted to respectively receive a first fluid pressure whose magnitude is representative of a pressure variable and a second fluid pressure whose magnitude is representative of a set point, means operably connected with a positive feedback chamber of said controller for comparing the fluid pressure applied to said first and second conduit means, said controller being further provided with a pressure regulating means controlled by the magnitude of a pressure applied to said positive feedback chamber and the difference in the magnitude of said first and second pressures of said pressure comparing means, said pressure regulating means being connected to an outlet of said controller to apply a pressure which varies with the magnitude of pressure in said positive feedback chamber and said differential existing between the process variable and set point pressures, said apparatus further comprising, a third conduit means connecting said outlet of said controller to said final control valve, a fourth conduit means connecting said first conduit means to said second conduit means, a fifth conduit means to momentarily connect a filtered air supply pressure flowing to a regulable fluid pressure supply means that is positioned in said second conduit means with said final control valve, a sixth conduit means connecting said positive feedback chamber with said third conduit means, said apparatus being conditioned for manual control when said first, fourth, fifth, and sixth conduit means are operable to an open position and said second and third conduit means are closed whereby said controller is disconnected from said final control valve, the pressure supplied to said final control valve is manually controllable by the magnitude of said filtered air supply pressure that is permitted to pass through an adjustable opening formed in said fifth conduit means, said apparatus being conditioned for switching directly between said manual control position to an automatic control position by adjusting said manually regulable fluid pressure supply means so that the pressure supplied thereby to said second conduit equals the pressure supplied to said first and second fluid pressure conduit means and by then closing said fourth, fifth, and sixth conduit means while said second and third conduit means is simultaneously open.

References Cited in the file of this patent
UNITED STATES PATENTS

| | | |
|---|---|---|
| 2,389,412 | Carlton | Nov. 20, 1945 |
| 2,389,413 | Carlton | Nov. 20, 1945 |
| 2,851,047 | Eller | Sept. 9, 1958 |